March 31, 1931. A. GUADAGNINI 1,798,792
PROCESS OF DEPURATING LIQUID
Filed Oct. 8, 1923
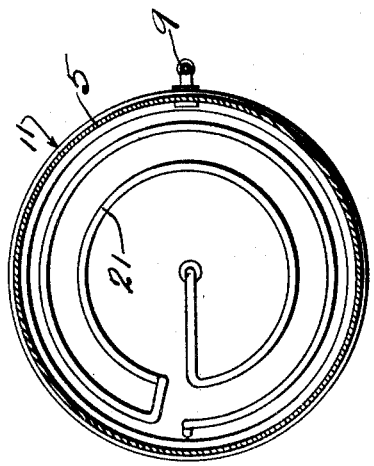
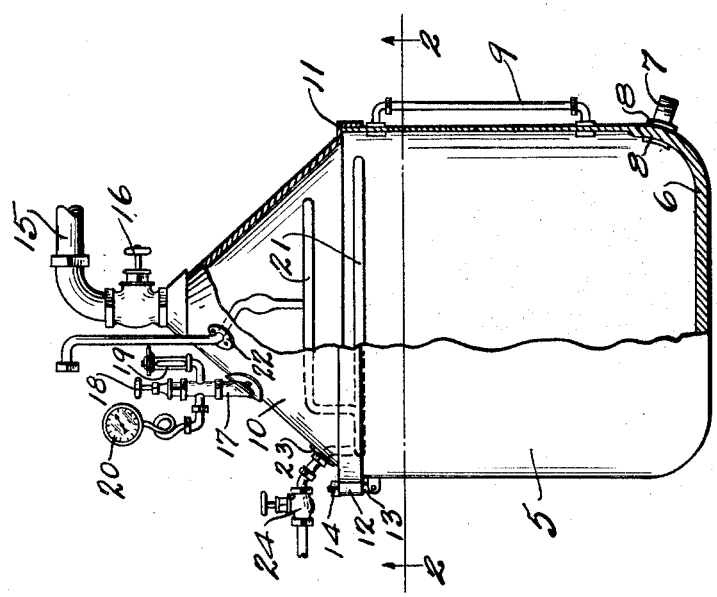
Inventor
Amalto Guadagnini Patented Mar. 31, 1931

1,798,792

UNITED STATES PATENT OFFICE

ARNALDO GUADAGNINI, OF NEW YORK, N. Y.

PROCESS OF DEPURATING LIQUID

Application filed October 8, 1923. Serial No. 667,426.

This invention relates to a process to obtain depurated and deodorated liquids, and is particularly adapted for the production and treatment of saccharine juice.

An important object of the invention is to provide a process by which are obtained depurated and deodorated liquids from different substances without the use of chemicals.

With reference to the application of my invention in the treatment of beets it provides a process by which the characteristic aromatic volatile substances of bad taste and smell will be expelled from the mixture of beets and water during the cooking of said mixture, retaining all the sugar contained previously in the beets together with their inorganic salts.

In the accompanying drawing forming a part of this specification and in which like numerals are employed to designate like parts throughout the same:

Figure 1 is a side elevation of an apparatus which is preferably employed in the practice of the process.

Figure 2 is a sectional plan view of same taken on the line 2—2 of Figure 1.

In the drawing I have shown the preferred form of apparatus in carrying out my improved process, in which the numeral 5 designates an autoclave or boiler into which a quantity of sliced beets are placed. Water is then added to the beets by means of the connection 7 retained in position on the boiler by means of the flanges 8, the amount of water being preferably one-fifth greater in weight than the raw material. For the purpose of gauging the amount of water added to the boiler, a glass gauge 9 is mounted on the boiler and enables the operator to determine the quantity of water in the receptacle at all times. A lid 10 is positioned on the boiler and is preferably conical in shape for the purpose of collecting the ascending gases near the top thereof, the bottom portion of the lid being provided with a flange 11 and securely held in position by lugs 12 which engage swinging bolts 13, said bolts carrying a nut 14 which is tightened by the operator to insure tight connection between the boiler and lid. Heat is now applied to the boiler with valve 18 open, and when steam comes out said valve is closed and a pressure of one-half atmosphere is maintained during the cooking operation, the pressure being regulated by a hand valve to maintain the pressure of one-half atmosphere denoted by the gauge 20. For the purpose of preventing excessive pressure accumulating in the boiler, a safety valve 19 should also be mounted on the apparatus. The mass should continue to cook at this pressure for a period of one-half hour, during which time the sugar and salts in the beets will begin to pass to the water. It is important that a pressure of one-half atmosphere is constantly maintained in the boiler during the cooking operation as it will extract both the sugar and inorganic salts from the beets. At the expiration of one-half hour steam is admitted into the superheater coil 21 through a valve 24 which is secured to the conical top by a flange 23. At the same time a valve 16 secured to the upper portion of the top is also opened, thereby permitting the heavy volatile substances rarefied by the superheater to be forced through the pipe 15 and into the atmosphere; it being understood, however, that sufficient heat is applied to the boiler to overcome the exhaust of vapor through said valve to provide for the maintenance of the required pressure of one-half atmosphere. The blowing out continues for one-half hour, during which time the required pressure is maintained in the boiler. At the expiration of this period the superheater and blow-off valves are closed and the previously mentioned cooking process continued for fifteen minutes, after which the superheater and blow-off valves are again opened and the substances allowed to blow-off for a continued period of fifteen minutes more. The blow-off valve 16 is now permitted to remain open while the application of heat is entirely eliminated thus permitting the gradual lowering of the pressure and elimination of the volatile bad smelling substances.

The coil 21 is connected with an outlet pipe which passes through the flange 22 mounted upon the top side of the boiler 5 and thus the steam may be circulated through the pipe 21 thereby keeping the coil in a heated condition thus creating pressure in the gases in the upper portion of the boiler and causing them to blow off freely through the pipe 15 when the valve 16 is open.

It is obvious from the past description that the entire operation takes place in the autoclave under pressure and consumes approximately one and one-half hours resulting in considerable saving in time over the methods now commonly employed, and in the present instance the process when practiced in the treatment of beets produces a depurated liquid containing sugar with the addition of inorganic salts.

Having thus described my invention, I claim:

1. The process for depurating a mixture of beets and water for the production of a saccharine liquid which consists in confining the mixture in a sealed vessel, applying heat to the vessel to cook the contents under pressure maintained at one-half atmosphere, superheating the vapor in the upper part of the vessel by means of a steam coil for quickly blowing out the vaporized impurities from the vessel, subjecting the mixture to a further cooking operation under pressure, and again superheating the vapor in the upper part of the vessel for blowing off the vaporized impurities.

2. The process for depurating a mixture of beets and water for the production of a saccharine liquid which consists in confining the mixture in a sealed vessel, applying heat to the vessel to cook the contents under a pressure of one-half atmosphere for approximately one-half hour, subjecting the vapor in the upper part of the vessel to superheating for quickly blowing off impurities from the vessel for approximately one-half hour, repeating the cooking under pressure for approximately fifteen minutes, and finally repeating the superheating of the vapors for approximately fifteen minutes.

In testimony whereof, I have affixed my signature.

ARNALDO GUADAGNINI.